United States Patent [19]

Evans et al.

[11] 4,050,305

[45] Sept. 27, 1977

[54] SHIELD AND BRACKET ASSEMBLY FOR FLOWMETER

[75] Inventors: Daniel J. Evans, Feasterville; Hubert Riester, Huntingdon Valley, both of Pa.

[73] Assignee: Fischer & Porter Company, Warminster, Pa.

[21] Appl. No.: 730,073

[22] Filed: Oct. 6, 1976

[51] Int. Cl.$^2$ ............................................. G01F 15/10
[52] U.S. Cl. ...................................... 73/209; 73/326; 73/272 R
[58] Field of Search ................. 73/209, 325, 326, 293, 73/272 R; 248/221.4

[56] References Cited

U.S. PATENT DOCUMENTS

| | | | |
|---|---|---|---|
| 966,468 | 8/1910 | Olson | 73/326 |
| 1,132,372 | 3/1915 | Mears | 73/326 |
| 3,181,359 | 5/1965 | Busillo | 73/209 |
| 3,232,106 | 2/1966 | Busillo | 73/209 |
| 3,416,370 | 12/1968 | Kaucher | 73/209 |
| 3,890,459 | 6/1975 | Caveney | 248/221.4 |
| 3,931,946 | 1/1976 | Soltysik | 248/221.4 |

Primary Examiner—Herbert Goldstein

[57] ABSTRACT

A protective shield and bracket assembly adapted to cooperate with a flowmeter in which a variable-area flow tube subject to breakage in the course of operation is supported in an upright position within a meter body having a rear wall in a manner exposing all but the rear portion of the tube, whereby the vertical position assumed by a float within the tube may be observed to provide a reading of flow rate. The bracket is formed by a strip which lies against the rear wall of the meter body and is secured thereto, the strip being provided with resilient arms which project forwardly from opposite sides thereof and terminate in fingers to which opposing margins of a channel-shaped transparent plastic shield are attached, whereby the exposed sides of the meter tube are enveloped by the shield to define a safety chamber which confines explosion products resulting from breakage of the tube. Fluid discharged from the shattered tube is exhausted rearwardly from the chamber to prevent injury to personnel in the vicinity of the flowmeter.

5 Claims, 4 Drawing Figures

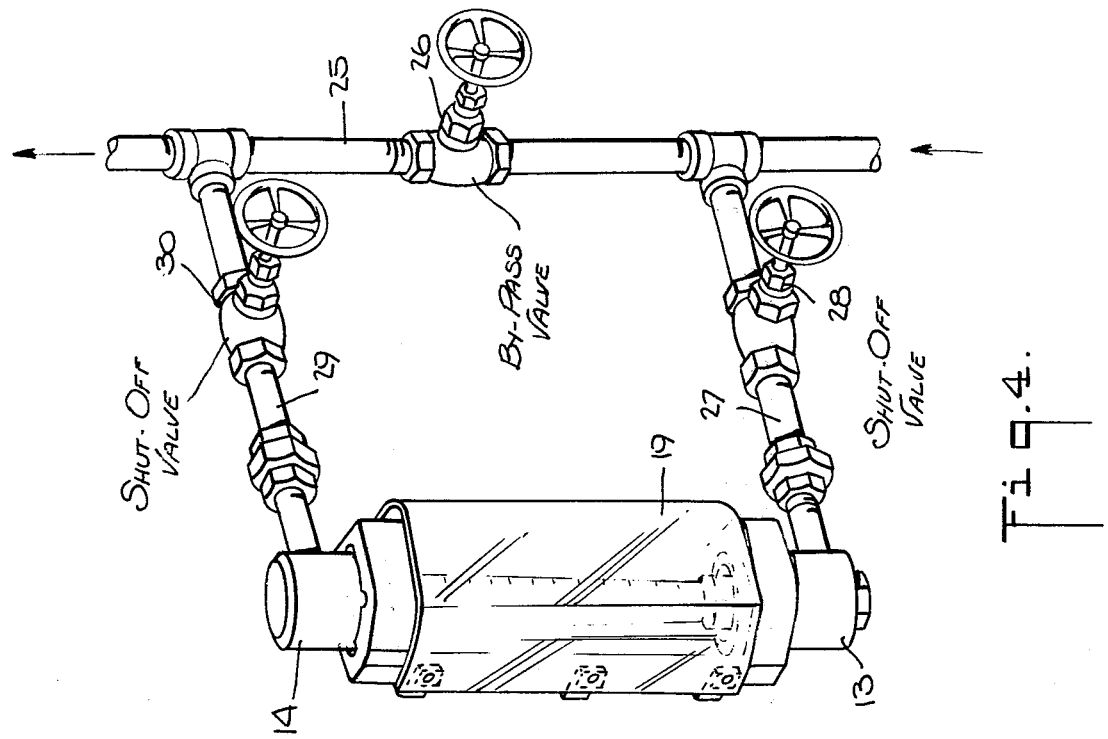
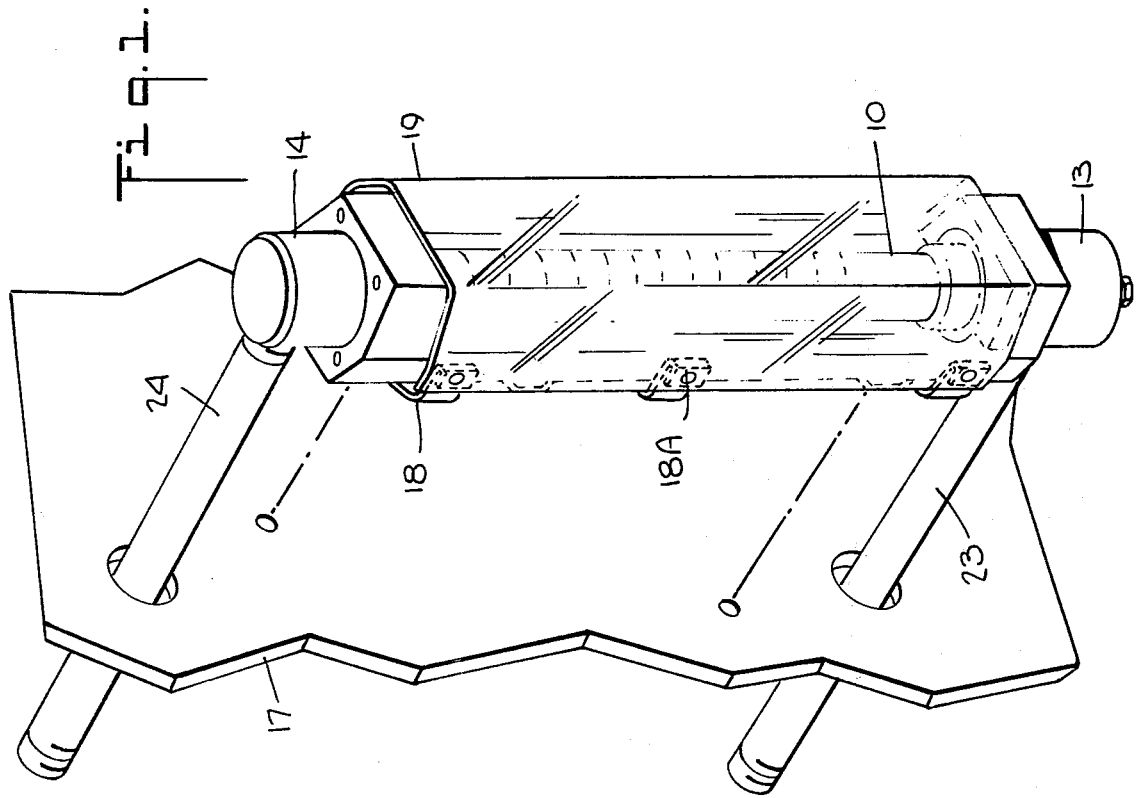

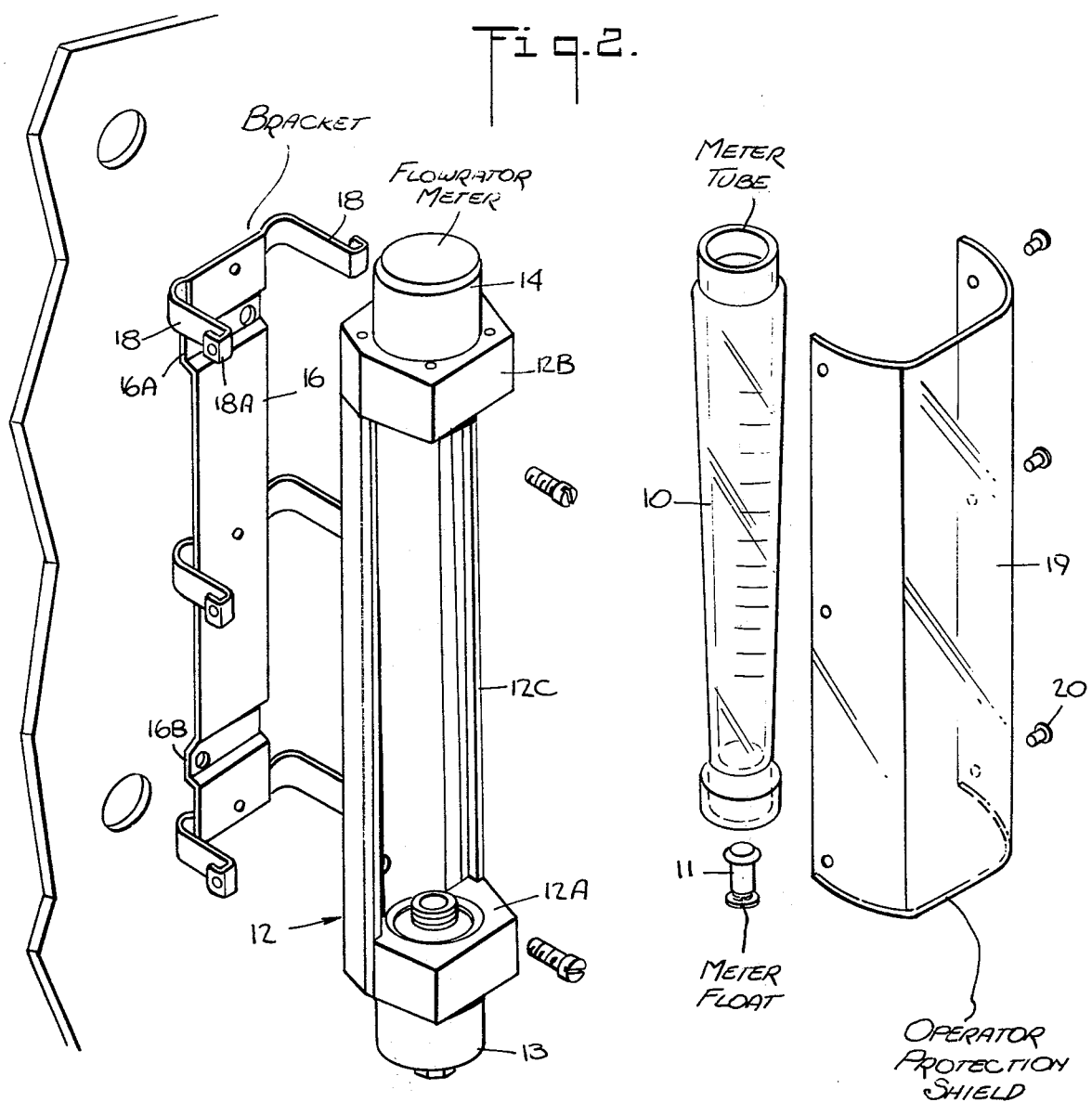
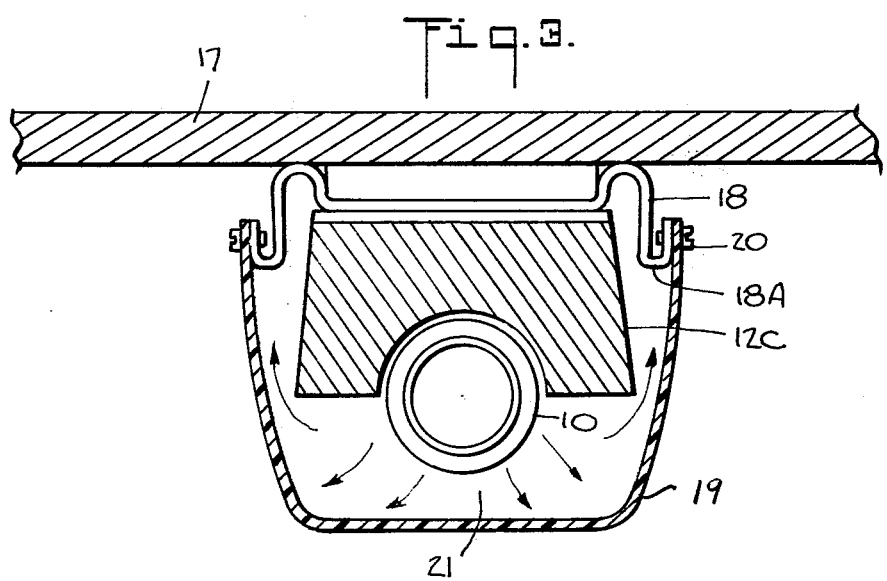

SHIELD AND BRACKET ASSEMBLY FOR FLOWMETER

BACKGROUND OF INVENTION

This invention relates generally to flowmeters of the variable-area tube type, and more particularly to a protective shield and bracket assembly for such flowmeters.

Flowmeters of the variable-area tube type are usually designated "rotameters," the term being derived from the fact that in early versions of such meters, the weighted plummet or float movable in the upright tube had slots therein to impart a rotational force thereto for the purpose of stabilizing and centering the float. The present trend, however, is toward non-rotating floats.

In a rotameter, the fluid to be metered, which may be a gas or liquid, is admitted to the lower end of the tapered bore in the tube and emerges from the upper end thereof, the float being raised to a position of equilibrium between the downward gravitational force of the float and the upward force of the fluid flowing through the annular orifice surrounding the float. The float assumes a vertical position that depends on the rate of fluid flow. This position is indicated along a calibrated scale on the front of the tube.

Because the meter tube is usually made of thin-walled glass and is relatively fragile, in existing types of variable-area tube flowmeters, the tube is supported by end fittings within a meter body adapted to protect the tube against stresses as well as to effect tight sealing thereof.

The pressure rating of a variable-area metering tube depends on the tensile characteristics of the glass as well as on its wall thickness. However, the maximum pressure rating of a given meter affords no assurance that breakage of the tube will not occur at pressures below its maximum rating.

Inherent material limitations can result in tube breakage. Glass is a brittle material which may break upon accidental impact. Breakage may also occur if the glass is subjected to thermal shock. Moreover, an exposed glass tube of good inherent strength may be weakened by surface scratches, nicks or cracks therein that may cause breakage when the tube is pressurized or subjected to vibrations. Incorrect installation or faulty operating methods can also give rise to tube breakage regardless of operating pressure. And with certain highly reactive fluids, the glass may erode evenly so that wear is not noticeable and there is no warning that the tube requires replacement to avoid breakage.

Should a variable area flow tube shatter in the course of operation, injuries may be inflicted on personnel in the vicinity thereof. Because the glass tube is under pressure, the hazards created by the resultant explosion is not only from the fragments of a glass but also from the suddenly released fluid which may be at high temperatures or contain dangerous chemicals.

SUMMARY OF INVENTION

In view of the foregoing, the main object of this invention is to provide a protective shield and bracket assembly adapted to cooperate with a standard flowmeter of the variable-area type, such that should the tube break in the course of operation, the resultant explosion of glass fragments and fluid is intercepted by a safety chamber surrounding the tube, the fluid discharged from the shattered tube being exhausted toward the rear of the chamber to avoid injury to personnel in the vicinity of the meter.

More particularly, it is an object of the invention to provide a shield and bracket assembly of the above-type which in no way interferes with existing mounting procedures whereby the flowmeter may be mounted in a vertical or horizontal flow line or on the front surface of an instrument panel.

A significant feature of the present invention is that a channel-shaped transparent shield of flexible plastic material is marginally attached to crooked fingers at the free ends of resilient arms projecting from a bracket attached to the rear wall of the meter body, whereby high pressures applied to the shield by explosive forces resulting from breakage of the tube cause the shield to yield and do not result in rupture thereof.

Still another object of this invention is to provide a low cost shield and bracket assembly which is combinable with a standard flowmeter without requiring any alteration in the flowmeter design, the shield being readily removable from the bracket to permit replacement, inspection or cleaning of the meter tube housed in the meter body.

Briefly stated, these objects are obtained in a protective shield and bracket assembly adapted to cooperate with a standard flowmeter in which a variable-area glass tube, subject to breakage in the course of operation, is supported in an upright position within a meter body having a rear wall in a manner exposing all but the rear portion of the tube, whereby the vertical position assumed by a float within the tube may be observed to obtain a reading of flow rate. The ends of the tube are received within inlet and outlet end fittings that are socketed in end sections of the meter body and coupled to pipes for conducting the fluid to be metered through the tube.

The bracket of the assembly is constituted by a rectangular strip which lies against and is secured to the outer surface of the rear wall of the meter body and is provided with at least two pairs of resilient arms that project forwardly from opposing sides of the strip to embrace the rear wall, the arms terminating in crooked fingers. The opposing margins of a channel-shaped shield of clear plastic material is attached to the fingers of the bracket to define a transparent safety chamber which envelops the exposed sides of the meter tube and confines the explosion products resulting from tube breakage, fluid discharged from the shattered tube being exhausted rearwardly from the chamber to prevent injury to personnel in the vicinity of the flowmeter.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a standard variable area tube flowmeter provided with a protective shield and bracket assembly in accordance with the invention and installed on the front of an instrument panel;

FIG. 2 is an exploded view of the front panel installation;

FIG. 3 is a transverse section taken through the installation; and

FIG. 4 illustrates the shielded flowmeter installed in a vertical flow line.

DESCRIPTION OF INVENTION

Front Panel Mounting

Referring now to FIG. 1, there is shown a standard flowmeter whose main components are an open-ended meter tube 10, a typical float 11, a meter body 12, an inlet end fitting 13 and an outlet end fitting 14. Tube 10, which is generally made of thin-walled borosilicate glass, has a precision molded bore 15 therein. The bore defines a variable area passage to accommodate float 11, which is caused by the fluid passing through the bore to assume a vertical position which depends on the flow rate.

Meter body 12, which is molded or otherwise formed of rigid plastic material of high strength, is constituted by a lower section 12A having a socket therein to receive inlet end fitting 13, an upper section 12B having a socket therein to receive outlet end fitting 14, and a rear wall 12C which extends between the upper and lower sections and is trough-shaped to receive the rear portion of the meter tube. When tube 10 is inserted within the meter body and its ends are engaged by end fittings 13 and 14, all but the rear portion of the tube is exposed so that the position of float 11 therein may be observed to obtain a reading of flow rate.

Outlet end fitting 14 is spring-loaded, so that the meter tube may be removed by pushing the tube upwards into the outlet fitting until the bottom of the tube clears the inlet fitting. When the tube is clear, its bottom is moved outwards from the meter body, and the tube is then lowered from the outlet end fitting to free it from the meter body. The reverse procedure is used in installing a tube within the meter body. Since tube 10 is replaceable, it is necessary that access thereto be readily had. This is made possible in the present invention, wherein the shield may be easily detached from the bracket of the assembly.

The bracket which cooperates with the flowmeter is formed by a rectangular strip 16 of a resilient metal, such as stainless steel, having a pair of lateral undulations or troughs 16A and 16B formed therein adjacent its upper and lower ends. These serve to space the body of the strip from an instrument panel 17, against which the meter is mounted, the spacing, as will be later explained, acting to provide an outlet through which fluid may be exhausted should the meter tube break.

Strip 16 is provided with three pairs of resilient arms 18 which project forwardly from opposite sides of the strip to embrace the rear wall of the meter body. The arms terminate in crooked fingers 18A, each having a threaded bore therein. One pair of arms 18 is located at the upper end of strips 16, the other pair being located at the lower end of the strip and the third pair at the midpoint of the strip, the arms embracing meter body 12.

Attachable to the bracket is a shield 19, which is fabricated of flexible, transparent plastic material of high strength, such as polycarbonate. The opposing margins of the shield are provided with bores 19A which register with the threaded bores in fingers 18A, the margins being attached to the crooked fingers by screws 20. The crook in the fingers provide a space between the shield margins and the rear wall of the meter body to provide a fluid outlet.

As shown in FIG. 3, when shield 19 is attached to the bracket, it envelops exposed sides of meter tube 10 to define a safety chamber 21 which serves to confine the explosion products that result should the tube break in the course of operation. These products are constituted by a shower of glass fragments and pressurized fluid. The fragments are projected by the explosive force against the surface of the shield and are contained thereby. The suddenly expanding fluid seeks to burst the confines of the safety chamber and subjects the walls of the shield to an outward pressure. But because of its resilient mounting on the bracket, the shield is not ruptured by this pressure but yields to accommodate itself thereto.

The fluid discharged from the shattered meter tube is exhausted rearwardly, as shown by the flow arrows in FIG. 3, from the oulet defined by the margins of shield 19 and the sides of the rear wall 12C of the meter body. Thus no fluid that might endanger personnel in the vicinity of the flowmeter is emitted outwardly.

It will be seen in FIG. 1 that meter body 12 is secured to panel 17 by mounting screws 22 which pass through holes in the meter body and through matching holes in troughs 16A and 16B in strip 16, the screws entering tapped holes in the panel. The fluid to be metered is admitted into the inlet end fitting 13 by an inlet pipe 23, the fluid passing through the meter tube being discharged therefrom through the outlet end fitting 14 which is coupled to an outlet pipe 24.

Flow Line Installation

FIG. 4 shows the shielded flowmeter installed in a vertical flow line 25 having a bypass valve 26 interposed therein so that the fluid in the pipe may be diverted through an inlet pipe 27 having a shut-off valve 28 therein into the inlet end fitting 13 of the meter, the fluid, after passing through the meter tube, being returned to the line by an outlet pipe 29 coupled to outlet end fitting 14, outlet pipe 29 being provided with a shut-off valve 30.

In this installation, shield 19 faces operating personnel, and should breakage of the meter tube occur, the shattered glass is confined by the shield, and the released fluid is diverted to the rear of the installation to avoid injury to personnel in the vicinity. While the meter should not be subjected to excessive vibration and the use of quickacting devices in the fluid stream should be avoided to prevent shock waves from damaging the meter, in many situations the existence of reciprocating pumps, compressors and other devices in the system make it difficult to minimize vibration and provide a smooth fluid flow free of surges and shock waves. Hence in practice it is important that the flowmeter be adequately shielded and that the shield be capable of withstanding the high explosive forces resulting from breakage.

Though a typical vertical flow installation has been shown it will be appreciated that the meter may be readily installed in horizontal flow lines or in any other system requiring flow rate measurement.

While there has been shown and described a preferred embodiment of a flowmeter shield and bracket assembly in accordance with the invention, it will be appreciated that many changes and modifications may be made therein without, however, departing from the essential spirit thereof.

I claim:

1. In combination with a standard flowmeter in which an open-ended variable-area flow tube subject to breakage is supported in an upright position within a meter body having a rear wall in a manner exposing all but the rear portion of the tube, whereby the vertical position of a float within the tube may be observed to provide a reading of flow rate, a shield and bracket assembly cooperating with said flowmeter to protect personnel in the vicinity of the flowmeter should the tube break in the course of operation, said assembly comprising:

A. a bracket formed by a vertical strip which is secured to the rear wall of said meter body and is provided with resilient arms which project forwardly from opposite sides thereof in spaced relation to the meter body, said arms terminating in fingers; and B. a channel-shaped transparent plastic shield whose opposing margins are attachable to said fingers of said resilient arms, said shield enveloping the exposed portion of the meter tube to define a safety chamber thereabout which confines explosion products resulting from breakage of the tube and exhausts fluid discharged from the shattered tube rearwardly from the chamber in the space between said arms and said meter body to prevent injury to personnel, said shield being formed of flexible material such that when it is subjected to an outward pressure by the force of an explosion, the shield supported on the resilient arms of the machine is not ruptured by this pressure but yields to accommodate itself thereto.

2. In the combination as set forth in claim 1, wherein said rear wall of the meter body bridges inlet and outlet sections having sockets to receive inlet and outlet end fittings engaging the open ends of said meter tube, said outlet end fitting being spring loaded whereby the tube may be removed and replaced.

3. The combination as set forth in claim 2, wherein said shield is attached to said fingers by screws whereby said shield may be detached to provide access to said tube.

4. The combination as set forth in claim 1, wherein three pairs of arms are provided, two of which are at the opposite ends of said strip, and the third of which is at the midpoint thereof.

5. The combination as set forth in claim 1, wherein said fingers are crooked to provide a chamber discharge outlet between said rear wall and the shield margin.

* * * * *